Aug. 24, 1948.   L. HIRSCHHORN   2,447,754
MANUFACTURING AND FILLING OF ESSENCE CONTAINING
PACKAGES FOR BREWING BEVERAGES
Filed June 24, 1940   3 Sheets-Sheet 2
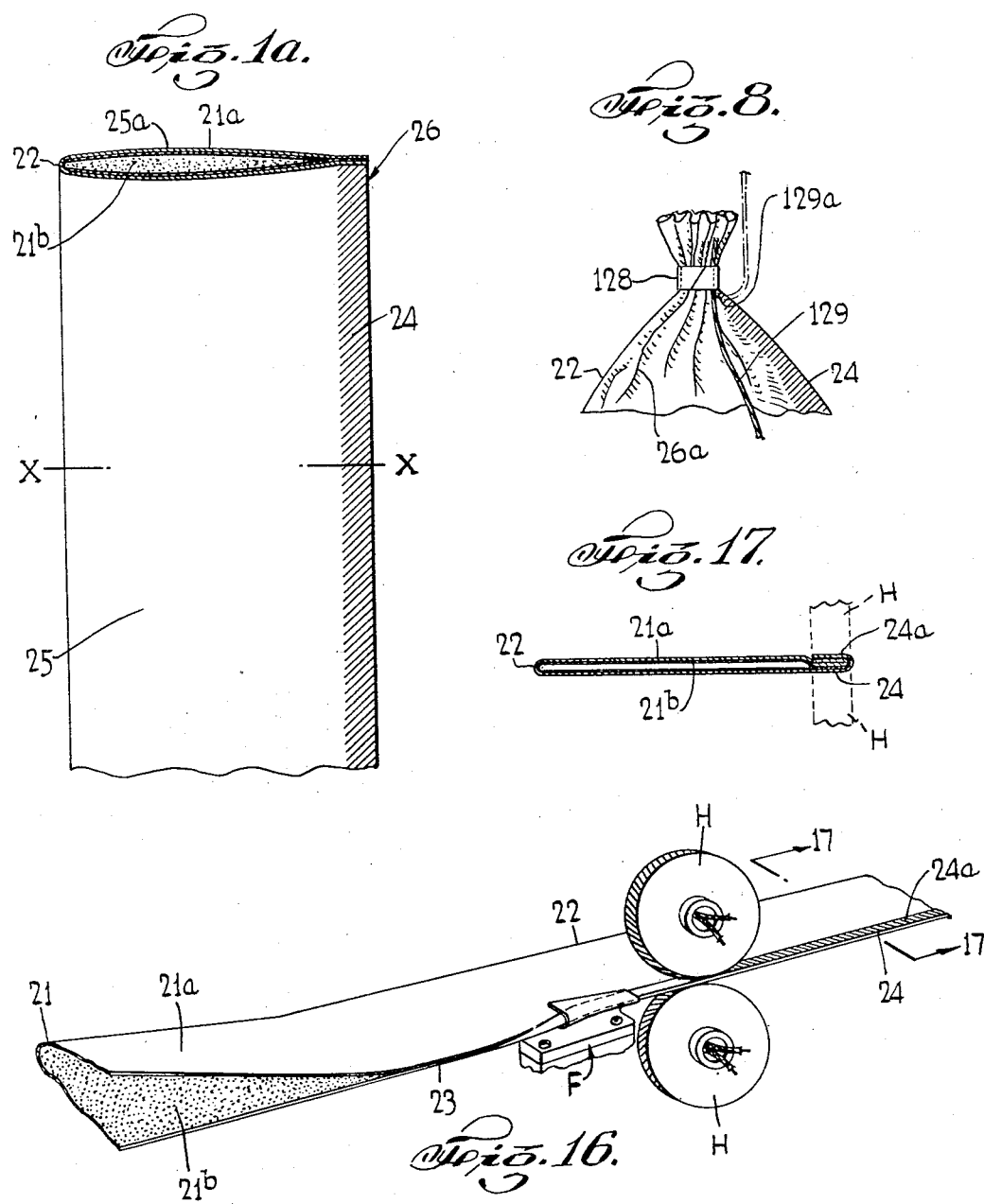
INVENTOR
LOUIS HIRSCHHORN
BY Louis Barnett
ATTORNEY

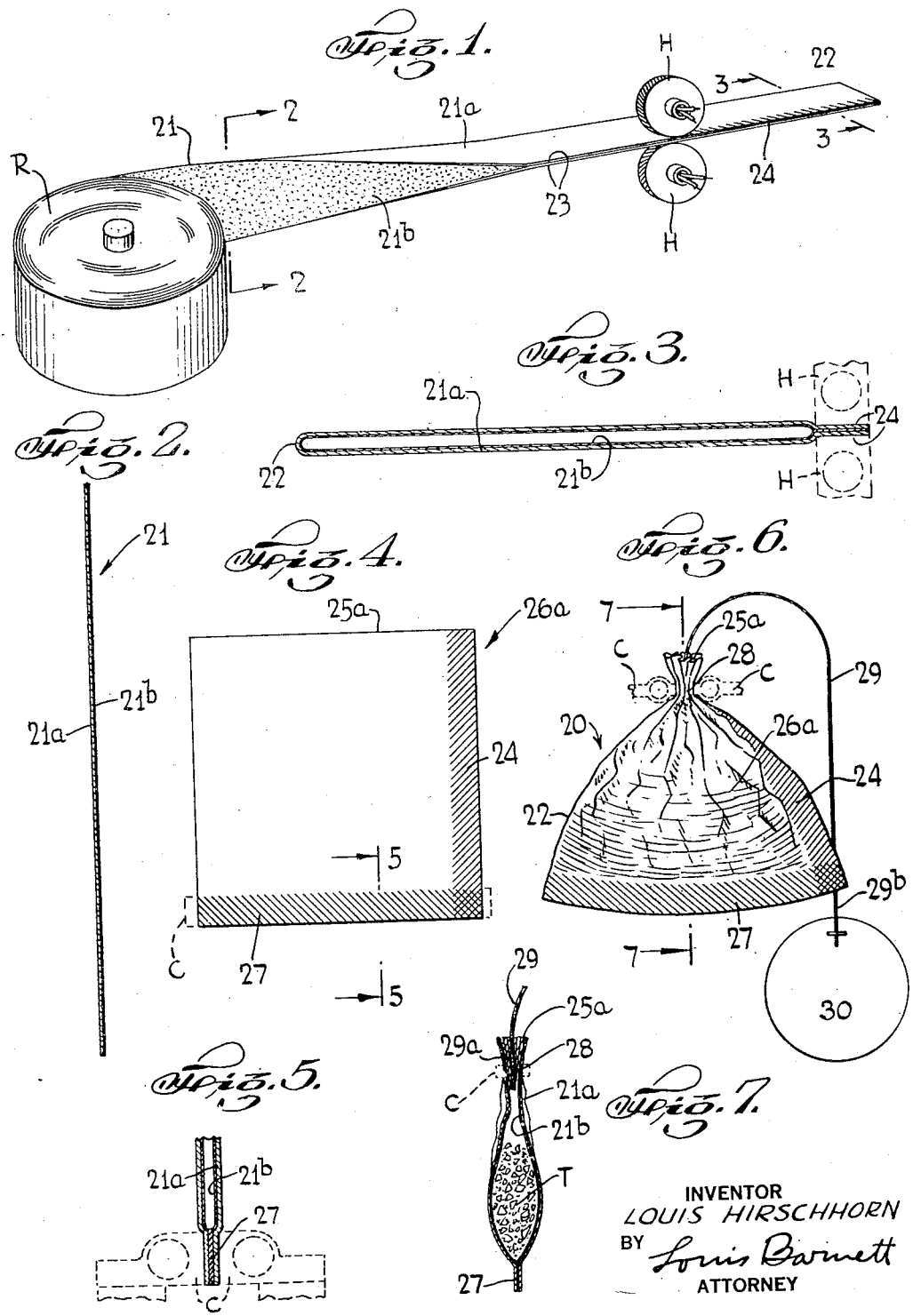

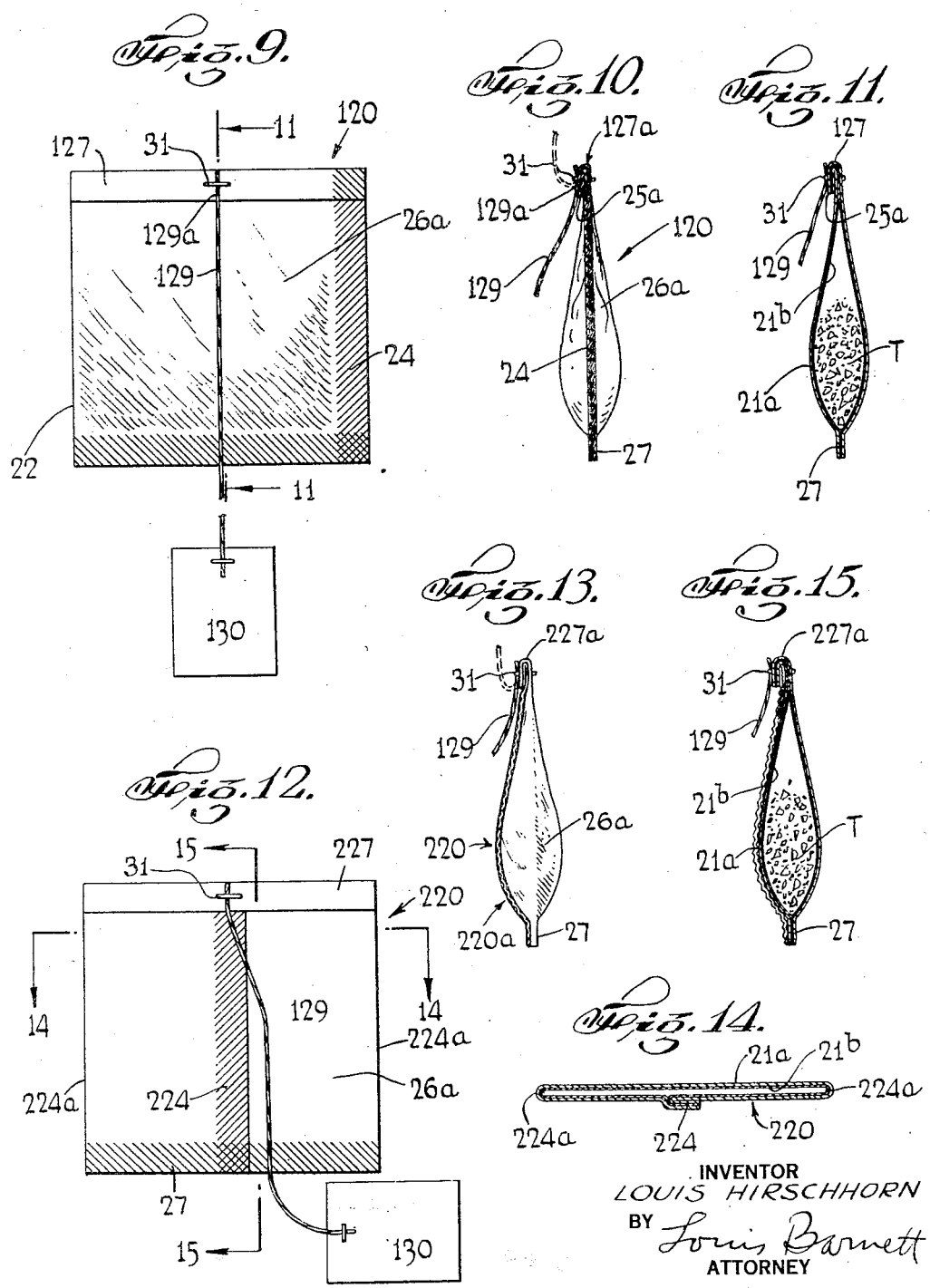

Patented Aug. 24, 1948

2,447,754

UNITED STATES PATENT OFFICE 2,447,754

MANUFACTURING AND FILLING OF ESSENCE CONTAINING PACKAGES FOR BREWING BEVERAGES

Louis Hirschhorn, Roslyn, N. Y., assignor, by mesne assignments, to National Urn Bag Co., Inc., Long Island City, N. Y., a corporation of New York Application June 24, 1940, Serial No. 342,053

2 Claims. (Cl. 93—3)

This invention relates to the manufacture and filling of containers or bags. Although in practising the invention containers or bags may be made for use to package various materials, the embodiment of the invention as herein described is directed to the novel method of packaging tea, coffee and similar essence containing products made and sold as complete articles of manufacture for use in brewing beverages, as for example, in making so-called tea-balls in containers or bags formed of suitable heat sealing filter sheet materials. The manufacture of such suitable sheet materials is described in the application of Theodore F. Menzel, Serial No. 335,694, filed May 17, 1940, issued as Patent No. 2,306,399, Dec. 29, 1942, which is also directed to the novel method of producing same.

Among the objects of the invention is to generally improve packages of the character described and the method of manufacturing same, which shall be capable of being produced of few and simple parts to form inexpensive articles of neat and attractive appearance, which improved method of manufacture shall be adapted particularly for large scale production on automatic machines, and which article and method shall be practical and efficient to a high degree in use.

Other objects of this invention will in part be obvious and in part hereinafter pointed out.

The invention accordingly consists in the features of construction and method, combination of elements, arrangement of parts, and steps of the process exemplified in the method hereinafter described, and of which the scope of application will be indicated in the following claims.

In the accompanying drawing in which possible illustrative embodiments of the invention are shown:

Fig. 1 is a perspective view showing the method of forming an elongated tubular structure from a web or strip taken from a roll embodying the invention;

Fig. 1a is a fragmentary view of a tubular structure formed as shown in Fig. 1 prior to being severed into unit sections as practised in carrying out said improved method;

Figs. 2 and 3 are cross-sectional views taken on lines 2—2 and 3—3, respectively, in Fig. 1;

Fig. 4 is a front elevational view showing the pressure heat sealing operation for forming the cross seam permanent bottom closure to provide a bag structure after cutting a bag unit section from the tubular structure;

Fig. 5 is a detailed cross-sectional view taken on line 5—5 of Fig. 4;

Fig. 6 is a front elevational view of a tea-ball showing the method of forming a pressure heat sealed gathered closure and string handle attachment;

Fig. 7 is a cross-sectional view taken on line 7—7 in Fig. 6;

Fig. 8 is a fragmentary view of a metal banded gathered closure that may be used in place of that shown in Figs. 6 and 7;

Figs. 9 and 10 are front elevational and side views, respectively, of a square pillow shaped type of tea-ball constructed with a pressure heat sealed edge seam to embody the invention;

Fig. 11 is a cross-sectional view taken on line 11—11 in Fig. 9;

Figs. 12 and 13 are front elevational and side views, respectively, showing another modification of the invention in the form of a square pillow shaped tea-ball constructed with a pressure heat sealed center overlapping extending seam;

Figs. 14 and 15 are cross-sectional views taken on lines 14—14 and 15—15, respectively, in Fig. 12;

Fig. 16 is a perspective view showing the method of forming the improved tubular structure with a foldover edge seam; and Fig. 17 is a cross-sectional view taken on line 17—17 in Fig. 16.

Referring in detail to the drawing, 20 denotes a gathered closure type of improved tea-ball manufactured by the method embodying the invention.

In practising said method for making tea-balls 20, suitable sheet material 21 may be supplied preferably from a roll R or other suitable source, said sheet material being in the form of a web or strip of the required width and of suitable foraminous structure, as for example, being formed of a base layer 21a of filter or perforated parchment paper, cotton gauze, or perforated Cellophane, said base layer 21a being superficially coated on one surface thereof with an adhering thermosetting "partially fused" lamina 21b of the character described in the above mentioned Menzel patent application without substantially decreasing the original porosity of the base layer 21a. Any other suitable filter heat sealing sheet material may be used provided that such sheet material will withstand immersion in boiling water without damage or integration and which permits ready passage therethrough of liquids for forming the brew and strains the contents T, such as tea, or coffee from passing out of the ball 20. The base layer 21a with coating lamina 21b when used as sheet material 21 are of such composition that they are insoluble in hot water, do not impart the slightest degree of odor or taste to the brew, and have no chemical reaction therewith.

The strip or web of said sheet material 21 with coated lamina 21b as it continuously comes off the roll R is first doubled on itself lengthwise to position the coated lamina 21b in face to face relation, that is, said sheet material 21 is folded on itself along the mid-portion of the length thereof at 22 as shown in Figs. 1 and 3.

Contiguous edge borders 23 of sheet material 21 extending the length of the strip opposite the fold 22 are then pressed together and heated at the fusion temperature of the thermosetting plastic forming the lamina 21b by suitable means, as for example, by passing said edge border 23 between heated rollers H to form a continuous longitudinally extending flat seam 24 in permanent adhesion, thereby providing an elongated tubular structure 25 from said strip of sheet material 21.

The tubular structure 25 is next cut successively to provide identical bag unit sections 26, each cut being made along a line X—X at a spaced distance from the upper or the remaining leading end 25a of the structure 25 as shown in Fig. 1a. The contiguous edge borders of the cut portion of each unit 26 extending across the width of the strip opposite the end 25a are then pressed together and heat sealed in the same manner as described above for seam 24 except this operation being preferably performed by suitable clamping heaters C or other heated means to form a continuous cross outwardly extending seam 27 in permanent adhesion joining the lower end of the longitudinal seam 24 of said section unit 26 to provide a bag structure 26a as seen from Figs. 4 and 5.

The bag structure 26a is now filled with an essence containing product, such as tea leaves T, which is inserted through the leading end or mouth 25a in the well understood manner (not shown). The portion of the bag 26a adjacent the mouth 25a is next gathered together to include the upper end of the longitudinal seam 24 and forms a closure which is also heat sealed like seams 24 and 27 described above for fusing the contacting surfaces of lamina 21b, all portions of said gathered end which have the lamina 21b being permanently fused together by a suitably constructed heated clamp C to form a crimped joint 28, as shown in Figs. 6 and 7. Before the crimped joint 28 is formed, one end 29a of a string handle 29, preferably pretreated or processed to have a "partially fused" coating in the manner described in said Menzel application, is inserted within the mouth 25a and is anchored therein during the permanent fusion of the crimped joint 28. The other end 29b of the string handle 29 may be terminated by a tag 30.

The gathered closure of the mouth 25a instead of being provided with the fused crimped joint 28 described above, may if desired be retained by means of a metallic ring or band 128 as shown in Fig. 8. Before the band 128 is clamped in position below the mouth 25a, one end 129a of a string handle 129 is inserted and anchored under said band 128, the other end 129b of said string handle being terminated by a tag (not shown) like the tag 30 shown in Fig. 6.

The tea-ball 20 thus formed confines the tea leaves T in the body of shallower depth and thickness than is otherwise possible with the longitudinal seam 24 and cross seam 27 arranged to serve as a trim for enhancing the attractive appearance of the tea-ball 20. It should be noted that this form of tea-ball 20, although made with a gathered end which ordinarily would tend to make the tea-ball bulbous in shape, provides here instead an almost pillow shape since the longitudinal and cross outwardly extending seams 24 and 27, respectively, formed with the heated sealed joints serve as stretchers or braces which gives the maximum spread to the body of tea balls and thereby facilitates the infusion or steeping action. The seams 24 and 27 also retain the container or bag structure of the unit section 26a flat and make available the maximum filtering area of the sheet material used, thus permitting the reduction to a minimum the required amount of such sheet material 21.

Another modification of the invention in the manufacture of a tea-ball 120 is shown in Figs. 9 to 11, inclusive. Here the unit sections 26 are manufactured and the joint seams 24 and 27 provided to form unit bag structure 26a by the same steps set forth above for tea-ball 20 but instead of providing a gathered top closure with suitable retaining means such as heat sealed crimped joint 28 or band 128, the portion of the bag unit section 26a adjacent the mouth 25a is subjected to pressure and a clamping heat sealed treatment by a suitable device similar to that used in heat sealing the bottom cross seam 27 to form a continuous cross outwardly extending seam 127 joining with the other end of the longitudinal seam 24 and thus form the top closure 127. Midway of the ends of the seam 127 there is anchored one end 129a of a string handle 129 by suitable means such as for example a wire rivet 31, said string being terminated at the other or free end by a tag 130.

It should be noted that the string handle 129 is secured to the bag unit section 26a so that the string handle extends over lengthwise the bag 26a as shown in Fig. 9. This form of securing the string handle 129 to the top closure 127 provides a loop or kink in the string end as at 129a (see dotted lines in Fig. 10) which resists and reduces to a minimum the chances of the string being pulled free from its anchorage as would be otherwise when the tea-ball is held suspended by the string. The tea-ball 120 here formed is pillow shaped and has besides the fold edge 22 a longitudinal seam 24 with two spaced outwardly extending cross seams 27 and 127 heat sealed like that shown at 27 in Fig. 6. The arrangement of said joint seams 24, 27 and 127 of tea-balls 20 and 120 not only provide a trim for enhancing the appearance of said tea-balls, but also serve as stretchers or bracers giving the maximum spread to the body of the tea leaves T and thereby facilitates the infusion or steeping action.

By applying the string handle 129 to the middle of the upper cross seam 127, the tea-ball is balanced when the filled bag is lifted so that the contents is retained in its most efficient thin shape due to the construction of the tea-ball with the upper cross seam 127, the lower cross seam 27, the longitudinal seam 24, and the anchorage of the string handle 129 to said upper cross seam 127 as described above and shown in Figs. 9 and 10.

To increase the strength of the tea-ball structure at the anchorage of the rivet 31 and string handle end 129a, the upper cross closure seam 127 may preferably be provided with a fold as at 127a which may be formed by overlapping prior to heat sealing the permanent joint seam 127 as shown in Figs. 10 and 11.

Still another modification of the invention is shown in Figs. 12 to 15, inclusive. In this embodiment the tea-ball 220, like that described above for manufacturing tea-balls 20 and 120, has the longitudinal extending flat seam 224 completed like seam 24 described above. Before the bottom cross joint seams 27, however, are applied to form unit section bags 26a, the joint seam 224 is moved to a central position and folded laterally, that is, overlapped to lie against the mid-portion of one of the flat sides 220a of the tea-ball 220 instead of extending outwardly from the edge thereof as in tea-balls 20 and 120. While the said joint seam 224 lies in said folded position lengthwise the bag section unit 26a, the cross joint seam 27 is pressed and heat sealed, thus forming flat pillow shaped unit section bags with jointless or spaced fold side edges 224a. The unit section bags 26a are then filled with tea T, or the like, and the top closure joint seams 227 preferably formed with fold 227a is pressed and heat sealed in the same manner described above for the manufacture of tea-ball 120. The string handle 129 terminated by tag 130 and anchored by rivet 31, or the like, to the joint seam 227 may be provided as described above for tea-ball 120.

In all the above described constructions using the improved method embodying the invention, the joint seams such as 24, 27, 127 and 227 are shown to have substantial width. This and the fact that the porous sheet material 21 is somewhat stiff, retains the original shapes of the tea-balls 20, 120 and 220 even when wet and immersed for brewing and consequently the tea contents T is in a relatively thinner layer than would be otherwise possible with a more flexible sheet material such as plain untreated gauze commonly used in making the conventional type of tea-ball.

To further strengthen the stretcher bracing effect of the joint seams, instead of heat sealing said seams 24 and 27 by merely pressing the edge portions 23 together, they may be first folded over as at 24a and thereafter heat sealed in such folded condition in identically the same manner as described above for seam 127 except providing a suitable means for providing a continuous folding operation as shown in Fig. 16.

The improved method above described of forming tea-balls 20, 120 or 220 may be performed as a continuous process and as such is particularly adapted for large scale production since it lends itself for cooperation in assembled actuation of so-called high speed automatic packaging, filling and sealing machine parts.

It is therefore seen that there is provided an improved article and method for making same in which the several objects of the invention are achieved and which are well adapted to meet the conditions of practical use.

As various possible embodiments of the invention may be made in the above invention and as various changes may be made in the embodiments of the method above set forth, it is to be understood that all matters herein set forth and shown in the accompanying drawing are to be interpreted as illustrative and not in a limiting sense.

Having thus described my invention I claim as new and desire to secure by Letters Patent:

1. The method of manufacturing infusion packages comprising the steps of folding a traveling strip of foraminous sheet material formed of a filter layer base coated on one side with an adhering porous "partially fused" thermosetting plastic lamina along the mid portion throughout the length thereof with the coated lamina side in face to face relation; pressing and heat sealing for permanent adhesion the opposite contiguous edge portions together into a longitudinally extending seam and forming an elongated continuous tubular structure from said strip with said lamina covering the interior surface thereof; cutting successive unit sections off said tubular structure one by one at spaced distances from an open end thereof; pressing and heat sealing for permanent adhesion the contiguous edge portions along the cut of each unit section with said lamina in face to face relation and forming an outwardly extending crossed seam joining with said longitudinal seam to provide a bag structure for the package; filling each unit section bag structure with an essence containing product through the open end thereof; gathering the material at said open end; and pressing and heat sealing for permanent adhesion the gathered material to form a top closure joint.

2. The method of manufacturing infusion packages comprising the steps of folding a traveling strip of foraminous sheet material formed of a filter layer base coated on one side with an adhering porous "partially fused" thermosetting plastic lamina along the mid portion throughout the length thereof with the coated lamina side in face to face relation; pressing and heat sealing for permanent adhesion the opposite contiguous edge portions together into a longitudinally extending seam and forming an elongated continuous tubular structure from said strip with said lamina covering the interior surface thereof; cutting successive unit sections off said tubular structure one by one at spaced distances from an open end thereof; pressing and heat sealing for permanent adhesion the contiguous edge portions along the cut of each unit section with said lamina in face to face relation and forming an outwardly extending crossed seam joining with said longitudinal seam to provide a bag structure for the package; filling each unit section bag structure with an essence containing product through the open end thereof; gathering the material at said open end; pressing and heat sealing for permanent adhesion the gathered material to form a top closure joint; and anchoring one end of a string handle within the gathered closure joint during the heat sealing operation thereof.

LOUIS HIRSCHHORN.

REFERENCES CITED

The following references are of record in the file of this patent:

UNITED STATES PATENTS

| Number | Name | Date |
|---|---|---|
| 1,310,796 | Hirschhorn | July 22, 1919 |
| 1,489,807 | Anderson | Apr. 8, 1924 |
| 2,114,625 | Bergstein | Apr. 19, 1938 |
| 2,125,758 | Waters | Aug. 2, 1939 |
| 2,149,713 | Webber | Mar. 7, 1939 |
| 2,154,083 | Bergstein | Apr. 11, 1939 |
| 2,187,417 | Doble | Jan. 16, 1940 |
| 2,192,605 | Salfisberg | Mar. 5, 1940 |
| 2,195,740 | Salfisberg | Apr. 2, 1940 |
| 2,213,602 | Yates | Sept. 3, 1940 |
| 2,254,510 | Bergstein | Sept. 2, 1941 |
| 2,281,582 | Irmscher | May 5, 1942 |